United States Patent
Depta et al.

(10) Patent No.: US 11,891,190 B2
(45) Date of Patent: Feb. 6, 2024

(54) AIRCRAFT NAVIGATION LIGHT AND AIRCRAFT COMPRISING THE SAME

(71) Applicant: Goodrich Lighting Systems GmbH & Co. KG, Lippstadt (DE)

(72) Inventors: Marion Depta, Lippstadt (DE); Anil Kumar Jha, Lippstadt (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 18/164,427

(22) Filed: Feb. 3, 2023

(65) Prior Publication Data
US 2023/0264832 A1 Aug. 24, 2023

(30) Foreign Application Priority Data
Feb. 23, 2022 (EP) ..................................... 22158365

(51) Int. Cl.
*B64D 47/06* (2006.01)
*B60Q 1/26* (2006.01)
(52) U.S. Cl.
CPC ........... *B64D 47/06* (2013.01); *B60Q 1/2607* (2013.01)
(58) Field of Classification Search
CPC ...................................................... B64D 47/06
See application file for complete search history.

(56) References Cited

U.S. PATENT DOCUMENTS

| 7,055,994 B2 | 6/2006 | Martin | |
| 2002/0196637 A1* | 12/2002 | Dubin | B64D 47/06 362/540 |
| 2016/0280396 A1* | 9/2016 | Schoen | B64D 47/06 |
| 2019/0144132 A1* | 5/2019 | Jha | H05K 1/181 362/470 |
| 2019/0291894 A1 | 9/2019 | Hessling-Von Heimendahl et al. | |
| 2019/0359348 A1* | 11/2019 | Pawliczek | B64D 47/04 |

(Continued)

FOREIGN PATENT DOCUMENTS

| EP | 3072819 | 9/2016 |
| EP | 3476746 | 5/2019 |

(Continued)

OTHER PUBLICATIONS

European Patent Office, European Search Report dated Jul. 21, 2022 in Application No. 22158365.1.

*Primary Examiner* — Eric T Eide
(74) *Attorney, Agent, or Firm* — SNELL & WILMER L.L.P.

(57) ABSTRACT

An aircraft navigation light, configured to be usable as any of a left forward navigation light, a right forward navigation light, and a tail navigation light of an aircraft, comprises a common support plate which is substantially vertical in the aircraft frame of reference; a first light source arranged on the common support plate for emitting red light; a second light source arranged on the common support plate for emitting green light; a third light source arranged on the common support plate for emitting white light; a driving circuit coupled to the first light source, the second light source and the third light source and configured to supply power to a selected one of the first light source, the second light source, and the third light source; and a blocking element arranged to limit the light output of the aircraft navigation light to one lateral side.

19 Claims, 7 Drawing Sheets

(56) References Cited

U.S. PATENT DOCUMENTS

| | | | |
|---|---|---|---|
| 2020/0094987 A1* | 3/2020 | Hessling-Von Heimendahl | ......... B64D 45/0005 |
| 2020/0094988 A1* | 3/2020 | Hessling-Von Heimendahl | ......... B64D 47/06 |
| 2020/0189766 A1* | 6/2020 | Jha | ......................... B64D 47/04 |

FOREIGN PATENT DOCUMENTS

| | | |
|---|---|---|
| EP | 3572334 | 11/2019 |
| EP | 3854694 | 7/2021 |

* cited by examiner

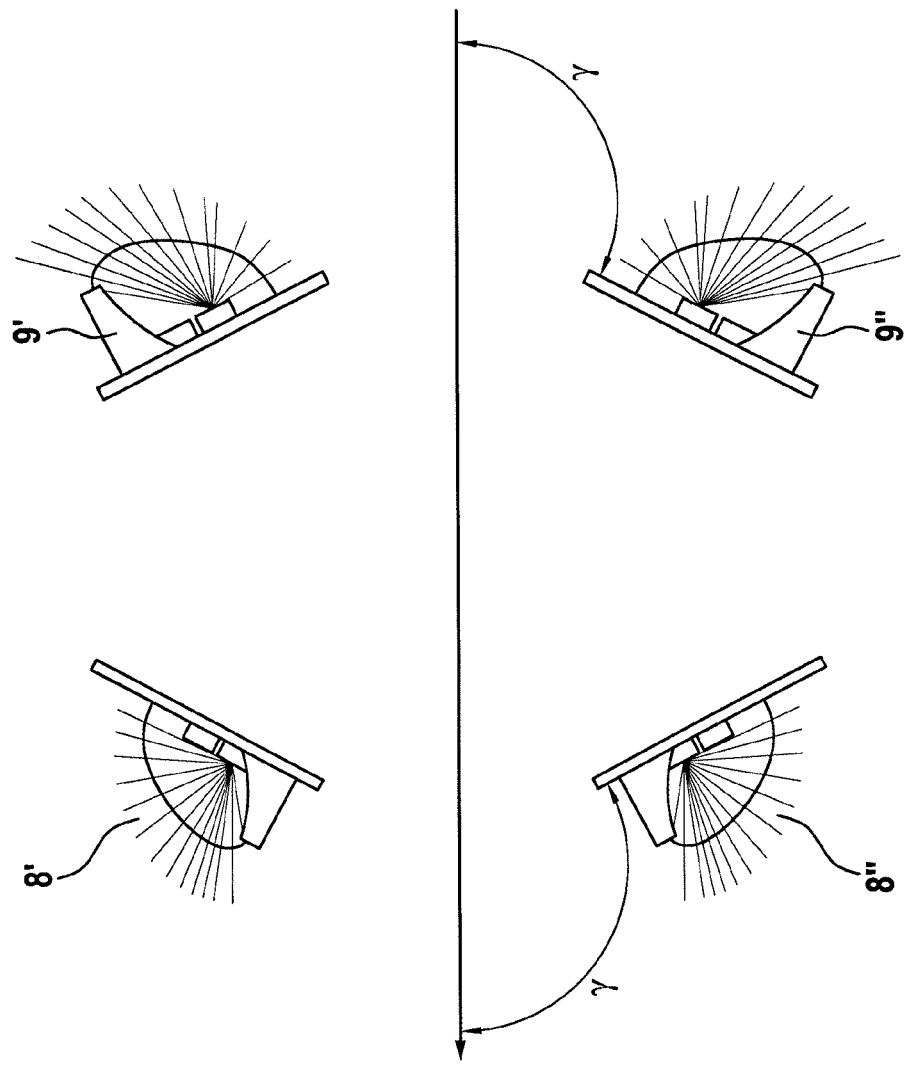

AIRCRAFT NAVIGATION LIGHT AND AIRCRAFT COMPRISING THE SAME

CROSS-REFERENCE TO RELATED APPLICATIONS

This application claims priority to, and the benefit of, EP Patent Application No. 22158365.1, filed Feb. 23, 2022 and titled "AIRCRAFT LIGHT AND AIRCRAFT COMPRISING THE SAME," which is incorporated by reference herein in its entirety for all purposes.

FIELD

The present invention relates to exterior aircraft lighting. In particular, it relates to aircraft navigation lights.

BACKGROUND

Almost all aircraft are equipped with exterior lighting systems. For example, large commercial aircraft have many different exterior lights. An exemplary group of exterior aircraft lights are lights for passive visibility, such as navigation lights and anti-collision lights. Another exemplary group of exterior aircraft lights are headlights that allow the pilots to view the area in front of them, when they are seated in the cockpit, such as taxi lights, take-off lights, landing lights, and runway turn-off lights. Yet another example of exterior aircraft lights are scan lights that allow the inspection of the aircraft structure in the dark, such as wing scan lights. It is apparent that the exterior lighting systems of modern aircraft are very complex technical systems.

Accordingly, it would be beneficial to provide an exterior aircraft light that allows for an overall less complex exterior aircraft lighting system and to provide an aircraft equipped therewith.

SUMMARY

Exemplary embodiments of the invention include an aircraft navigation light, configured to be usable as any of a left forward navigation light, a right forward navigation light, and a tail navigation light of an aircraft, the aircraft navigation light comprising a common support plate which is substantially vertical in the aircraft frame of reference; a first light source arranged on the common support plate for emitting red light; a second light source arranged on the common support plate for emitting green light; a third light source arranged on the common support plate for emitting white light; a driving circuit coupled to the first light source, the second light source and the third light source, and configured to supply power to a selected one of the first light source, the second light source, and the third light source; and a blocking element arranged to limit the light output of the aircraft navigation light to one lateral side, wherein the first light source and the second light source are arranged asymmetrically with respect to a horizontal reference plane through the common support plate, and/or wherein the third light source is arranged farther from the blocking element than the first and second light sources.

Exemplary embodiments of the invention allow for the provision of a navigation light that is usable in at least three locations of an aircraft and that, thus, allows for reducing the number of different light units required for the exterior aircraft lighting system. For example, an aircraft navigation light according to exemplary embodiments of the invention may be usable as any of a left forward navigation light, a right forward navigation light, and a tail navigation light, thus allowing for the production, storage, and assembly line usage of only one type of aircraft navigation light for three or more locations. As compared to previous approaches, where three different, but confusingly similar navigation lights were used, exemplary embodiments of the invention allow for efficiency gains in the production of navigation lights, space savings in the storage of navigation lights, reduction of assembly errors during the assembly of the navigation lights to the aircraft, and/or reduction of assembly time losses due to hold-ups on the assembly line of the aircraft.

The aircraft navigation light has a first light source for emitting red light, a second light source for emitting green light, and a third light source for emitting white light. In this way, the aircraft navigation light can assume the functionality of three previously different navigation lights. In accordance with its positioning in the aircraft, the aircraft navigation light can carry out the desired functionality. With navigation lights for aircraft commonly emitting one of red, green, and white light, the provision of light sources of three different colors may allow for the aircraft navigation light, as described herein, to be used in place of three navigation lights of previous approaches.

The first light source, the second light source, and the third light source are mounted on a common support plate. In particular, the first light source, the second light source, and the third light source may be mounted on a common printed circuit board. The mounting board may be arranged in the aircraft navigation light in such a way that it is oriented generally vertically in the aircraft frame of reference, i.e. when the aircraft navigation light is assembled to the aircraft. Mounting the first light source, the second light source, and the third light source on the common support board may allow for providing a well-defined and mechanically stable arrangement.

The aircraft navigation light further comprises a driving circuit that is coupled to the first light source, the second light source and the third light source. The driving circuit may be selectively connectable to any of the first light source, the second light source, and the third light source via one or more switches. In this way, the circuit complexity regarding the driving of the light sources may be kept low. While a common driving circuit with low circuit complexity may be beneficial in some embodiments, it is also possible that the common driving circuit is an adaptive driving circuit and adapts its power output depending on whether the first light source is coupled thereto, the second light source is coupled thereto or the third light source is coupled thereto.

The aircraft navigation light further comprises a blocking element, arranged for limiting the light output from all of the first light source, the second light source, and the third light source to one lateral side. The blocking element may in particular block light in such a way that no light of a particular color overlaps into an unintended region. For example, for the case of a right/left forward navigation light, the blocking element may be arranged to block light that would otherwise be emitted towards the wrong side. In particular, the blocking element may be arranged to block green light from being emitted towards a left side of the aircraft, to block red light from being emitted towards a right side of the aircraft, and to block white light from being emitted into the front left sector or right front sector of the aircraft.

The first light source and the second light source may be arranged asymmetrically with respect to a horizontal reference plane through the common support plate. The asymmetric arrangement of the first and second light sources on the common support plate may contribute to a compact structure of the aircraft navigation light, while helping to keep the difference in the light output intensity of the red light output and the green light output low. With the asymmetric arrangement, the light yield for the red and green light outputs may be more similar for a given operating current, as compared to a symmetric arrangement. In particular, the light source closer to an ideal/nominal light source position may use its light output potential better than the light source farther away from the ideal/nominal light source position. The different distances with respect to the ideal/nominal light source position may thus help to compensate for inherently different luminous flux values between the first light source emitting red light and the second light source emitting green light. A highly effective, multi-purpose aircraft navigation light may be provided, even in very compact arrangements of the aircraft navigation light, where slight variations in distance with respect to the ideal/nominal light source position may give rise to a significant difference in the light output.

The third light source may be arranged farther from the blocking element than the first and second light sources. In this way, the third light source may provide for a white light output having a larger horizontal opening angle than the first and second light sources. The aircraft navigation light may thus be well-suited to effectively satisfy the different Federal Aviation Regulations (FAR) requirements for red and green forward navigation lights on the one hand and white tail rearward navigation lights on the other hand. In particular, according to the FAR, the tail navigation lighting of an aircraft requires a larger horizontal opening angle than the right/left forward navigation lighting. The more distal arrangement of the third light source with respect to the blocking element may contribute to meeting the requirements in an effective manner.

The asymmetric position of the first and second light sources with respect to the horizontal reference plane and the more distal arrangement of the third light source from the blocking element, as compared to the first and second light sources, may jointly contribute to providing an aircraft navigation light that can effectively be used for red, green, and white navigation lighting, while allowing a compact implementation of the aircraft navigation light.

The aircraft navigation light may be configured to satisfy the Federal Aviation Regulations (FAR) requirements for at least two of the red forward navigation light, the green forward navigation light, and the white rear navigation light. In particular, the aircraft navigation light may be configured to satisfy the FAR requirements for the red forward navigation light and the green forward navigation light. In this context, reference is made to FAR sections 25.1385 through 25.1397, in particular to FAR sections 25.1391 and 25.1393. Further in particular, the aircraft navigation light may be configured to satisfy the FAR requirements of the red forward navigation light, the green forward navigation light, and the white rear navigation light with the respective operation of a single light source. In particular, the aircraft navigation light may be configured to satisfy the FAR requirements for the green forward navigation light with operating the first light source only and may be configured to satisfy the FAR requirements for the red forward navigation light with operating the second light source only. In other words, the aircraft navigation light may provide the full coverage, as required by the FAR requirements, for three navigation lights. It is also possible that two aircraft navigation lights, as described herein, are jointly used to satisfy the FAR requirements for the white tail navigation lighting of the aircraft.

According to a further embodiment, the blocking element may be symmetric with respect to the horizontal reference plane. In this case, the horizontal reference plane is identical to a plane of symmetry of the blocking element. The symmetric blocking element may allow for the aircraft navigation light to emit corresponding light outputs in the Northern and Southern hemisphere in the aircraft frame of reference.

According to a further embodiment, the blocking element may be a common shutter element, blocking a portion of the light emitted by any of the first light source, the second light source, and the third light source. In other words, for each of the first light source, the second light source, and the third light source, the common shutter element blocks a portion of the light. The common shutter element may provide a particularly clean cut-off for the light output.

Alternatively, the blocking element may be a common reflector, reflecting a portion of the light emitted by any of the first light source, the second light source, and the third light source. By providing a common reflector, a clean cut-off for the light output may be achieved, while using the reflected light in other portions of the light output and, thus, increasing the overall useful light yield.

According to a further embodiment, the first light source, emitting red light, may be arranged closer to the horizontal reference plane than the second light source, emitting green light. In particular, the first light source and the second light source are arranged on the common support plate such that a center of the first light source is distanced less than a distance threshold value from the horizontal reference plane and a center of the second light source is distanced more than the distance threshold value from the horizontal reference plane A. The distance threshold value may be between 0.4 mm and 0.6 mm, in particular 0.5 mm. In this way, different luminous flux values between the first light source and the second light source may be at least partially compensated for, so that the green light output and the red light output may become highly comparable. In particular, a green LED may have approximately 30% more luminous flux. The green light output may thus be less sensitive to the green light source not being right at the ideal/nominal light source location, as compared to the red light source. Thus, the asymmetric arrangement of the first light source and the second light source on the common support plate may compensate for such imbalances between them.

According to a further embodiment, the third light source is arranged symmetrically with respect to the horizontal reference plane. In other words, the third light source may be arranged on or around the horizontal reference plane.

According to a further embodiment, the first light source, the second light source, and the third light source are arranged asymmetrically with respect to a virtual reference plane which is orthogonal to the horizontal reference plane and crosses a nominal light source location on the common support plate.

According to a further embodiment, the light output of the aircraft navigation light has a larger horizontal opening angle when the third light source is operated than when the first or second light source is operated, wherein the light output of the aircraft navigation light in particular has a horizontal opening angle of between 110° and 120°, when the first or second light source is operated, and has a horizontal opening angle of between 120° and 140°, when the third light source is operated.

According to a further embodiment, the blocking element is arranged to prevent light emission in a lateral sector covering at least a horizontal angle of between 0° and 30° with respect to the common support plate for the light output of any of the first light source, the second light source and the third light source. In particular: the blocking element is arranged to prevent light emission in a lateral sector covering a horizontal angle of between 0° and 70° for the light output of the first and second light sources and preventing light emission in a lateral sector covering a horizontal angle of between 0° and 40° for the light output of the third light source.

According to a further embodiment, the first light source is a green LED, the second light source is a red LED, and the third light source is a white LED. The provision of accordingly colored LEDs as the first light source, the second light source, and the third light source allows for an immediate generation of the light of the desired color. LEDs are long-lasting, small, and efficient light sources that allow for an efficient operation of the aircraft navigation light, having low maintenance requirements and a small space envelope. Also, the provision of LEDs allows for a good integration of the three light sources with the common optical element, in particular a very close positioning of the three light sources to each other. In an alternative embodiment, it is possible to use LEDs of another color, such as white LEDs, for the first, second, and third light sources and to apply according color filters to the LEDs.

According to a further embodiment, the aircraft navigation light further comprises a lens, arranged on the common support plate for conditioning light emitted by any of the first light source, the second light source, and the third light source. The lens may jointly encase the first light source, the second light source, and the third light source. In this way, the lens is well-positioned to affect light of any of the first light source, the second light source, and the third light source, and to modify the light output in a desired manner. The provision of a common lens for the first light source, the second light source, and the third light source is an effective way of reaching a desired light output intensity distribution, because the common lens can be provided in a desired free form with little complexity. In particular, the lens may be a molded structure. In particular, the lens may be overmolded over the first light source, the second light source, and the third light source. The lens may be in direct contact with the first light source, the second light source, and the third light source. It is also possible that the lens is spaced from the first light source, the second light source, and the third light source. In the latter case, the lens may be configured to shape the light from the first, second, and third light sources both when entering the lens and when exiting the lens. The lens may be a refractive lens. It may also have reflective portions. The lens may be from a highly resistant and durable material, such as silicone. However, the lens may be made from any transparent or translucent material that has suitable refractive and, potentially, reflective properties.

According to a further embodiment, the lens comprises a total internal reflection portion, with a portion of the light emitted by any of the first light source, the second light source, and the third light source being reflected by the total internal reflection portion, before leaving the aircraft navigation light. Providing a total internal reflection portion is an effective way of concentrating light output in or around a particular light emission direction. In this way, a strong light output in a particular direction, such as a flight direction of the aircraft, can be achieved in the general framework of a lens. The lens may provide for the strong light output in the particular direction, while shaping the light output in other directions in a suitable manner.

Exemplary embodiments of the invention further include an aircraft, comprising at least one aircraft navigation light according to any of the embodiments above. The additional features, modifications, and beneficial effects, described above with respect to the exemplary embodiments of the aircraft navigation light, apply to the aircraft in an analogous manner.

According to a further embodiment, the aircraft comprises a plurality of aircraft navigation lights according to any of the embodiments above. In particular, the aircraft may comprise a plurality of aircraft navigation lights according to any of the embodiments above, wherein at least some or all of the plurality of aircraft navigation lights are of the same design.

The aircraft may be an airplane or a helicopter or an unmanned aerial vehicle.

According to a further embodiment, the aircraft comprises a left forward aircraft navigation light in a front portion of a left wing tip of the aircraft and a right forward aircraft navigation light in a front portion of a right wing tip of the aircraft, wherein each of the left forward aircraft navigation light and the right forward aircraft navigation light is an aircraft navigation light according to any of the embodiments above. In particular, the left forward aircraft navigation light and the right forward aircraft navigation light may be of the same design. Due to their different positions in the left and right wing tips, due to their different orientations in the aircraft frame of reference, and due to their different controls, the same kind of aircraft navigation light may effectively satisfy the different requirements for left and right forward navigation lighting.

According to a further embodiment, the aircraft further comprises two tail aircraft navigation lights according to any of the embodiments above, wherein the two tail aircraft navigation lights are arranged in rear portions of the left wing tip and the right wing tip of the aircraft, respectively, or wherein the two tail navigation lights are arranged in a tail portion of the aircraft. In particular, the two tail aircraft navigation lights may be of the same design. Further in particular, all of the left forward aircraft navigation light, the right forward aircraft navigation light, and the two tail aircraft navigation lights may be of the same design. Due to their different positions, due to their different orientations in the aircraft frame of reference, and due to their different controls, multiple aircraft navigation lights of the same kind may jointly satisfy the FAR requirements for navigation lighting all around the aircraft in an effective manner.

According to a further embodiment, for each of the left forward aircraft navigation light and the right forward aircraft navigation light, the common support plate is inclined with respect to a transverse direction in the aircraft frame of reference and the blocking element is arranged inboard of the first light source, the second light source, and the third light source. With the inclined orientation of the common support plate and the inboard arrangement of the blocking element, the light output of the left and right forward aircraft navigation lights can be effectively limited to the respective sectors of red and green light outputs, as required by the FAR.

According to a further embodiment, the common support plate of each of the left forward aircraft navigation light and the right forward aircraft navigation light is inclined at an inclination angle of between 100° and 120° with respect to a forward flight direction of the aircraft.

According to a further embodiment, for each of the tail aircraft navigation lights, the common support plate is inclined with respect to a transverse direction in the aircraft frame of reference and the blocking element is arranged outboard of the first light source, the second light source, and the third light source. With the inclined orientation of the common support plate and the outboard arrangement of the blocking element, the light output of the tail aircraft navigation lights can be effectively limited with respect to the sectors of red and green light outputs, provided by the forward aircraft navigation lights.

According to a further embodiment, the common support plate of each of the tail aircraft navigation lights is inclined at an inclination angle of between 100° and 120° with respect to a rearward direction of the aircraft.

BRIEF DESCRIPTION OF THE DRAWINGS

Exemplary embodiments of the invention are described in detail below with reference to the figures, wherein:

FIG. 9 a schematic top view of the four aircraft navigation lights of the aircraft of FIG. 8, illustrating their inclination angles with respect to a forward/rearward direction of the aircraft.

DETAILED DESCRIPTION

Figure 1:
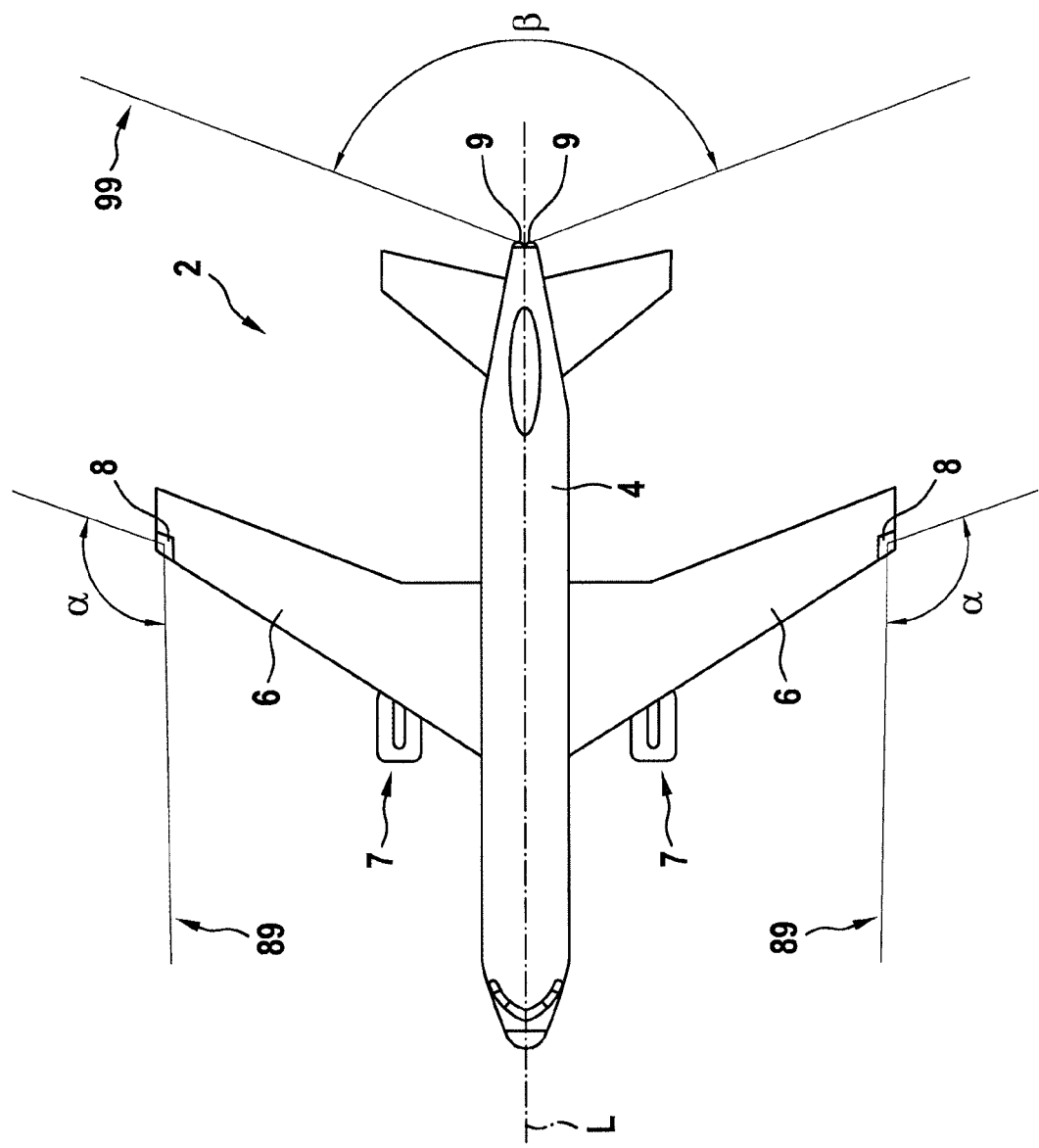
FIG. 1 depicts a schematic top view of an aircraft in accordance with an exemplary embodiment of the invention, the aircraft being equipped with multiple aircraft navigation lights in accordance with exemplary embodiments of the invention.

FIG. 1 depicts a schematic top view of an aircraft 2, in particular an airplane 2, in accordance with an exemplary embodiment of the invention. The aircraft 2 comprises a fuselage 4 and two wings 6 extending laterally from the fuselage 4. An engine 7 is mounted to each of the wings 6, respectively.

The aircraft 2 is provided with four aircraft navigation lights 8, 9, which may also be referred to as aircraft position lights 8, 9. The aircraft navigation lights 8, 9 include two tail navigation lights 9, mounted to a tail end of the fuselage 4, and two forward navigation lights 8, respectively mounted to the outer wing tips of the wings 6. The two tail aircraft navigation lights 9 are aircraft navigation lights in accordance with exemplary embodiments of the invention. The forward navigation lights 8 are also aircraft navigation lights in accordance with an exemplary embodiment of the invention. The two tail aircraft navigation lights 9 may share a common enclosing structure, such as a common housing and a common protective cover. However, as the light sources, support plates and optics of the two tail aircraft navigation lights 9, as described below, are separate from each other and form respective lighting units/lighting structures, they are herein viewed as separate aircraft navigation lights in accordance with exemplary embodiments of the invention, When projected onto a virtual horizontal plane, the light output 89 emitted by the forward navigation lights 8 covers an area extending from the direction of flight, i.e. 0°, which is substantially corresponds to a longitudinal axis L of the aircraft 2, outwardly over an angle $\alpha$ of 110°, i.e. until 20° in the rearward direction. The aircraft navigation light 8 mounted to the starboard side, i.e. to the right side when viewed in the direction of flight, emits green light, and the aircraft navigation light 8 mounted to the port side, i.e. to the left side when viewed in the direction of flight, emits red light. As will be explained below, both aircraft navigation lights 8 have a red light source, a green light source, and a white light source. Depending on their position in the aircraft frame of reference, they emit red light only or green light only.

The tail navigation lights 9 jointly emit a white light output 99. The light output 99 of the tail navigation lights 9 extends over an angle $\beta$ of 140° (+/−70°) in the horizontal plane. The light output 99 of the tail navigation lights 9 is centered around the longitudinal axis L of the aircraft 2. As stated above, the tail navigation lighting arrangement of the aircraft 2 of FIG. 1 includes two aircraft navigation lights in accordance with exemplary embodiments of the invention.

The light outputs 89, 99 of the four aircraft navigation lights 8, 9, in combination, cover a full circle of 360°, so that the light output of at least one of the four aircraft navigation lights 8, 9 is visible from any position around the aircraft 2. From the rear of the aircraft 2, the light outputs of both tail navigation lights 9 are visible and re-enforce each other.

Figure 2:
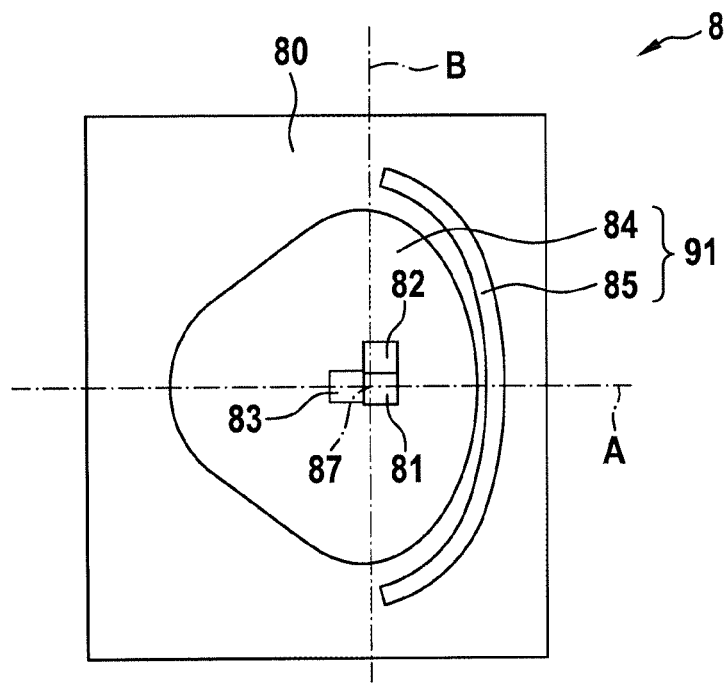
FIG. 2 shows a schematic top view of an aircraft navigation light according to an exemplary embodiment of the invention.
Figure 3:
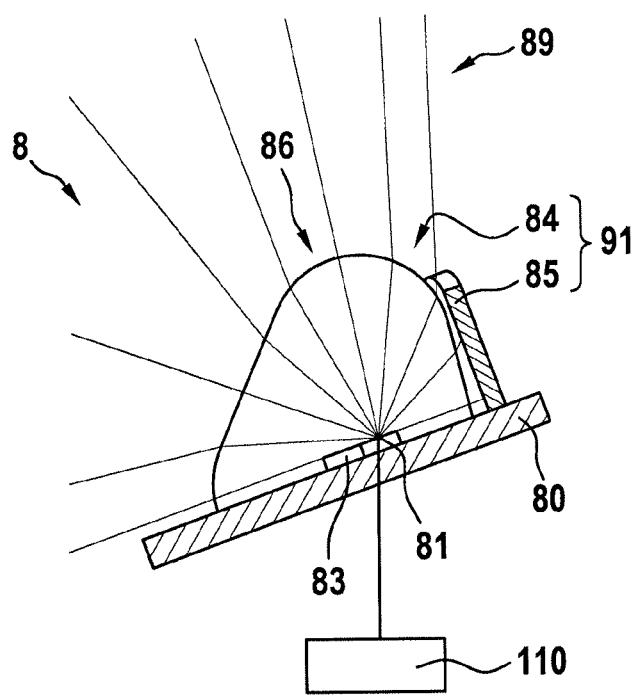
FIG. 3 shows a schematic cross-sectional view of the aircraft navigation light shown in FIG. 2.
Figure 4:
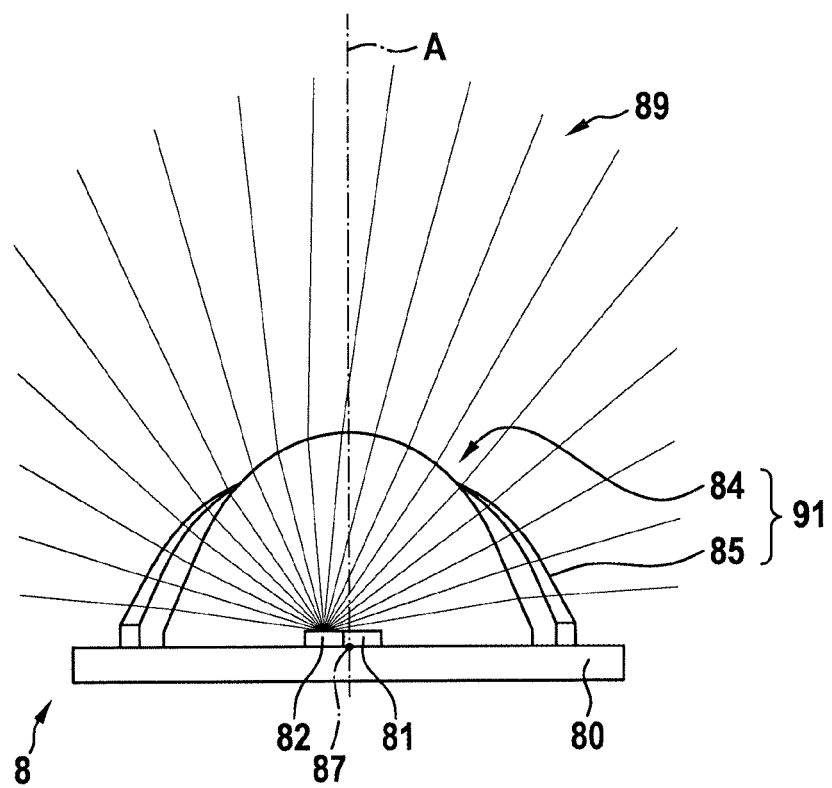
FIG. 4 shows a schematic front view of the aircraft navigation light shown in FIGS. 2 and 3.

FIG. 2 shows a schematic top view of an aircraft navigation light in accordance with an exemplary embodiment of the invention, FIG. 3 shows a schematic cross-sectional view thereof, and FIG. 4 shows a schematic front view thereof. The top view of FIG. 2 and the front view of FIG. 4 are denoted top and front views in the light unit frame of reference. As is apparent from basic geometric considerations, the views of FIGS. 2 and 4 are different side views in the aircraft frame of reference, i.e. when the aircraft navigation light is assembled to an aircraft. In FIGS. 2-4, the aircraft navigation light is denoted with the reference numeral 8. This indicates that the aircraft navigation light is usable both as a left forward navigation light and as a right forward navigation light, denoted with reference numeral 8 in FIG. 1. It will become apparent from the below discussion that the aircraft navigation light of FIGS. 2-4 is also usable as a tail navigation, denoted with reference numeral 9 in FIG. 1. Simply for the sake of ease of readability, the single reference numeral 8 is used throughout FIGS. 2-4.

The aircraft navigation light 8 comprises three light sources 81, 82, 83, namely a first light source 81, a second light source 82, a third light source 83, mounted to a common support plate 80. The first light source 81 and the second light source 82 are asymmetrically arranged on the common support plate 80 with respect to a horizontal reference plane A through the common support plate 80. In particular, the first light source 81 is arranged closer to the horizontal reference plane A than the second light source 82. In FIG. 2, the horizontal reference plane A is identical to a plane of symmetry of a lens 84 and a shutter element 85. The third light source 83 is arranged symmetrically with respect to the horizontal reference plane A. The third light source 83 and either the first light source 81 or the second light source 82 are also asymmetrically arranged on the common support plate 80 with respect to a vertical reference plane B, which is orthogonal to the horizontal reference plane A and crosses a nominal light source location 87. The nominal light source location 87, also referred to as reference point 87, means a location on the common support plate 80 where a single light source would be normally placed if the aircraft navigation light 8 had the single light source only.

In the depicted exemplary embodiment, each of the first to third light sources 81, 82, 83 is an LED. Particularly, the first light source 81 is a red LED, the second light source 82 is a green LED, and the third light source 83 is a white LED. The arrangement of the three light sources 81, 82, 83 on the common support plate 80 will be described in detail below.

The common support plate 80 may be a printed circuit board (PCB), provided with electrical connections, which are configured for supplying electrical power to the first to third light sources 81, 82, 83. The common support plate 80 is substantially vertical in the aircraft frame of reference, i.e. when the aircraft navigation light 8 is mounted to an aircraft. The horizontal reference plane A and the vertical reference plane B are 'horizontal' and 'vertical' also in the aircraft frame of reference, respectively.

The first, second, and third light sources 81, 82, 83 are covered by a common, at least partially light transmissive lens 84. The lens 84 may be overmolded over the first, second, and third light sources 81, 82, 83. It may thus be in direct contact with the first, second, and third light sources 81, 82, 83. The lens 84 may provide a transparent cover, covering and tightly encasing the first, second, and light sources 81, 82, 83 with respect to the support plate 80, thus protecting the first, second, and third light sources 81, 82, 83. The lens 84 may be made of silicone, in particular of silicone having a refractive index of about 1.4.

The lens 84 not only covers the first, second, and third light sources 81, 82, 83, but further forms part of a common optical system 91 for the first, second, and third light sources 81, 82, 83, which is configured for shaping the light output 89 emitted by the first, second, and third light sources 81, 82, 83. It can also be said that the common optical system 91, in particular the lens 84 thereof, conditions the light emitted by the first, second, and third light sources 81, 82, 83. In the exemplary embodiment of FIGS. 2-4, the lens 84 mainly conditions the light of the first, second, and third light sources 81, 82, 83 via its refractive light exit surface 86.

The common optical system 91 comprising the lens 84 may be configured to generate the desired light output 89 extending over an angle α of 110°, as it is shown in FIG. 1. The aircraft navigation light 8 is provided with a common shutter element 85, which is also part of the common optical system 91, and which is configured to block any light emitted beyond the direction of flight, i.e. configured to block a light output towards the sector of the respectively other one of the two forward aircraft navigation lights 8. The common shutter element 85 may also block a white light output from the tail navigation lights towards the adjacent sectors of the red and green forward navigation lights.

The shutter element 85 and the lens 84 are formed symmetrically with respect to a plane of symmetry which is identical to the horizontal reference plane A, as shown in FIG. 2 and extending through the aircraft navigation light 8. The plane of symmetry A is oriented horizontally, when the aircraft navigation light 8 is mounted to the aircraft 2. The common optical system 91, including the lens 84 and the shutter element 85, is designed for shaping the light emitted by a light source which is arranged at a nominal/ideal light source location 87, also referred to as reference point 87, as shown in FIGS. 2 and 4 and located on said plane of symmetry A.

The common optical system 91 is designed so that it still works for small deviations of the positions of the light sources from the optimal reference point 87. I.e., the optical system 91 and the first, second, and third light sources 81, 82, 83 and their light intensities are designed so that a desired light output having a desired light intensity distribution is generated and emitted by the aircraft navigation light 8 despite the fact that none of the first to third light sources 81, 82, 83 is arranged exactly at the reference point 87. Rather, the common optical system 91 and the first to third light sources 81, 82, 83 and their light intensities are designed so that a desired light intensity distribution is achieved regardless of which one of the three light sources is switched on. The extension of the common optical system 91 may be at least an order of magnitude greater than the distance between the centers of the first to third light sources 81, 82, 83. In other words, the first, second, and third light sources 81, 82, 83 may be arranged very close to each other, as compared to the extension of the common optical system 91. For example, the common optical system 91 may have an extension of between 20 mm and 50 mm, while the distance between the centers of the first and second light sources may be in the range of between 1 mm and 5 mm. In this way, the aircraft navigation light is very compact. The arrangement of the first, second and third light sources 81, 82, 83 around the reference point 87 gives rise to different light intensity distributions in the light output, which may, however, be counteracted by the particular arrangement of the first, second and third light sources 81, 82, 83, as described herein.

In a region close to the shutter element 85, which is depicted on the right side in FIGS. 2 and 3, the lens 84 has a curved portion with a curved cross-section, which is shaped for providing the desired light output 89. In a region more distant from the shutter element 85, i.e. in a region more to the left in FIGS. 2 and 3, the lens 84 has a linear portion with a linear cross-section, which also contributes to generating the desired light output 89. It is pointed out that the given shape/design of the lens 84 is exemplary only and that various other shapes/designs may be provided. Another exemplary shape is depicted in FIG. 7.

It is to be noted that the lens 84 is not considered an indispensable element of the aircraft navigation light 8. That is, the common optical system 91 may comprise the shutter element 85 only. In an embodiment, the common optical system 91 may comprise a common reflector only, reflecting a portion of the light emitted by any of the first light source 81, the second light source 82, and the third light source 83.

FIG. 3 shows the aircraft navigation light 8 in a cross-sectional view, taken along the horizontal reference plane A, i.e. along the plane of symmetry A, indicated in FIG. 2. It is assumed that the viewing direction towards the aircraft navigation light 8 is from the top in the aircraft frame of reference in FIG. 3 and that the direction of flight, i.e. the forward direction in the aircraft frame of reference, is upwards in the viewing plane of FIG. 3. Hence, the aircraft navigation light 8 of FIG. 3 is mounted to the aircraft 2 as a left forward navigation light. This can be seen from the light output 89, which ranges from forward in the aircraft frame of reference to the left, slightly rearward side. In the depicted exemplary embodiment, the light intensity close to the direction of flight is higher than in lateral directions, shown to the left in FIG. 3. In this way, the light output of the aircraft navigation light 8 corresponds somewhat to the FAR requirements for forward navigation lights, which require higher light intensities for small angles with respect to the direction of flight than for larger angles with respect to the direction of flight.

In FIG. 3, the aircraft navigation light 8 further comprises a driving circuit 110 which is coupled to the first light source 81, the second light source 82, and the third light source 83. The driving circuit 110 supplies power to a selected one of the first light source 81, the second light source 82, and the third light source 83.

FIG. 4 illustrates that the green LED 82 emits light, while the red LED 81 is inactive. The resulting light output 89 is green. While the first and second light sources 81, 82 are shown as substantially flat structures for better illustration, it is apparent that the first, second, and third light sources 81, 82, 83 may be dome shaped. The flat structure may keep the mutual shadowing effects low.

Figure 5:
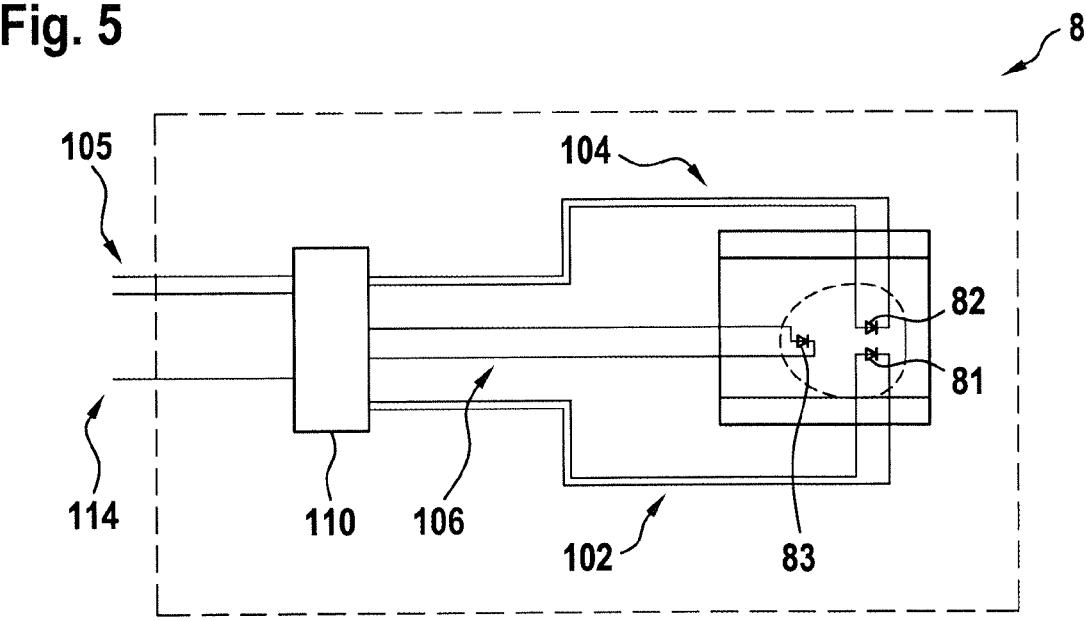
FIG. 5 shows a schematic circuit diagram of the aircraft navigation light shown in FIGS. 2 to 4.

FIG. 5 shows a schematic circuit diagram of the aircraft navigation light 8 of FIGS. 2 to 4. The aircraft navigation light has a power input 105 and a control input 114. Via the power input 105, the aircraft navigation light 8 receives power from an external power supply, such as from an on-board power distribution network. Via the control input 114, the aircraft navigation light 8 receives on/off commands, e.g. issued by the pilot in the cockpit. The control input 114 is coupled to the driving circuit 110, which receives the on/off commands.

The power input 105 is coupled to the driving circuit 110, which is coupled to the first light source 81 via a first power line 102, to the second light source 82 via a second power line 104, and to the third light source 83 via the third power line 106.

The driving circuit 110 is configured to supply power of a suitable voltage and/or a suitable current to a selected one of the first light source 81, the second light source 82, and the third light source 83, depending on an installation location of the aircraft navigation light 8.

Figure 6:
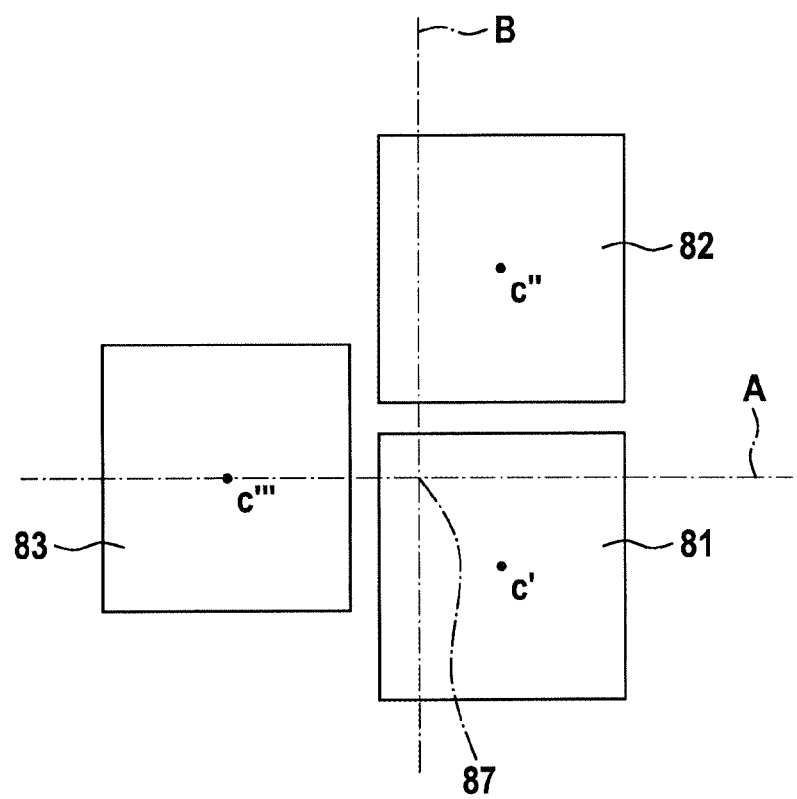
FIG. 6 shows a partial top view of an aircraft navigation light in accordance with an exemplary embodiment of the invention, depicting an arrangement of three light sources only.

FIG. 6 shows a partial top view of an aircraft navigation light 8 according to an exemplary embodiment of the invention, depicting an arrangement of three light sources 81, 82, 83 only. As shown in FIG. 6, the first light source 81 is arranged closer to the horizontal reference plane A than the second light source 82. That is, the first light source 81, emitting red light, is arranged closer to the horizontal reference plane A than the second light source 82, emitting green light. In particular, the first light source 81 and the second light source 82 are arranged on the common support plate 80, such that a center C' of the first light source 81 is distanced less than 0.5 mm from the horizontal reference plane A and a center C" of the second light source 82 is distanced more than 0.5 mm from the horizontal reference plane A. In this way, different luminous flux values between the first light source 81, which is a red LED, and the second light source 82, which is a green LED, may be compensated for. In particular, the better relative position between the lens 84 and the red LED 81 may be balanced, to some extent, by a higher light yield of the green LED 82 for a given operating current. In particular, a green LED may have approximately 30% more luminous flux. Thus, the asymmetric arrangement of the first light source 81 and the second light source 82 on the common support plate 80 may compensate for imbalances in the light output among the red and green LEDs.

In FIG. 6, the third light source 83 is arranged symmetrically with respect to the horizontal reference plane A. On the other hand, the third light source 83 and either the first light source 81 or the second light source 82 are asymmetrically arranged on the common support plate 80 with respect to the vertical reference plane B. In particular, the first, second, and third light sources 81, 82, 83 are arranged on the common support plate 80 such that the center C', C" of the first light source 81 or the second light source 82 is distanced less than 0.5 mm from the vertical reference plane B, while the center C''' of the third light source 83 is distanced more than 1.0 mm from the vertical reference plane B.

Also, as shown in FIG. 2, the third light source 83 is arranged farther from the shutter element 85 than the first and second light sources 81, 82. In this way, the third light source 83 may provide for a light output with a larger horizontal opening angle than the first and second light sources 81, 82, which is well-suited for satisfying the requirements of the FAR. Particularly, as shown in FIG. 1, the requirements for the tail navigation lighting comprise a larger horizontal opening angle ($\beta=140°$) than that ($\alpha=110°$) of the right/left navigation light 8. The more distant arrangement of the third light source 83 with respect to the shutter element 85 may contribute to meeting the requirements.

A single aircraft navigation light in accordance with exemplary embodiments of the invention may be sufficient for satisfying the FAR requirements for the tail navigation lighting. However, as the light intensity may be quite non-uniform in the horizontal plane, which may be a desired feature for forward navigation lights as discussed above, the embodiment of FIG. 1 has two tail aircraft navigation lights 9. When providing the two tail aircraft navigation lights 9 in a flipped arrangement with respect to the longitudinal axis L of the aircraft, the non-uniform light outputs may balance out to some degree, and an overall comparably uniform white light output may be provided towards the rear of the aircraft by the combination of the two tail aircraft navigation lights 9.

Figure 7A:
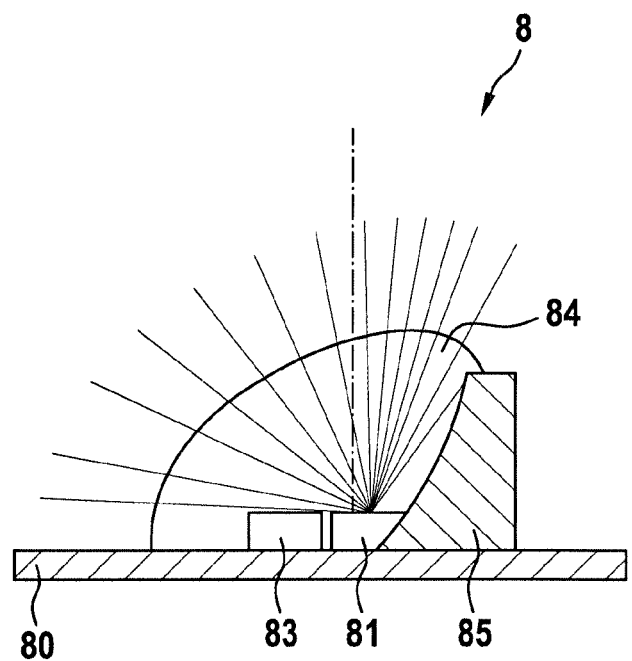
FIG. 7A depicts a schematic side view of an aircraft navigation light in accordance with an exemplary embodiment of the invention, illustrating an exemplary light output when either the first light source or the second light source is operated.
Figure 7B:
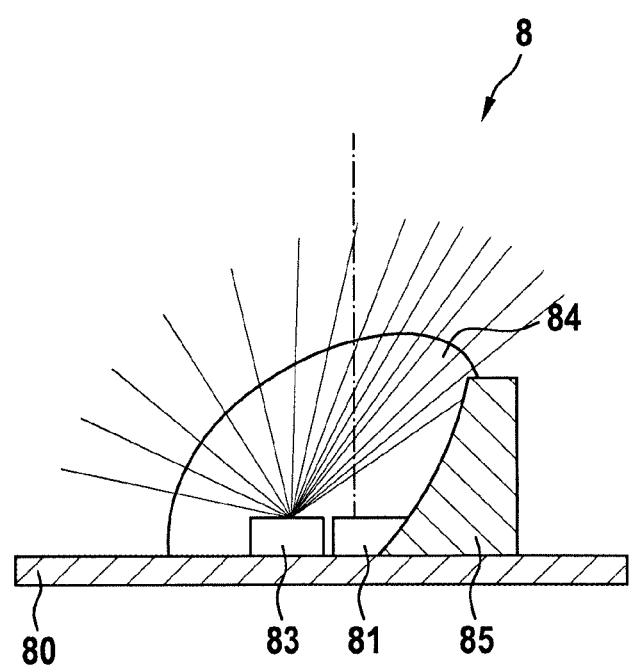
FIG. 7B depicts a schematic side view of the aircraft navigation light of FIG. 7A, illustrating an exemplary light output when the third light source is operated.

FIG. 7A depicts a schematic side view of an aircraft navigation light in accordance with an exemplary embodiment of the invention, illustrating an exemplary light out-put when either the first light source 81 or the second light source 82 is operated. FIG. 7B depicts a schematic side view of the aircraft navigation light of FIG. 7A, illustrating an exemplary light output when the third light source 83 is operated. In both cases, the shutter element 85 blocks a portion of the light emitted by any of the first light source 81, the second light source 82, and the third light source 83 to limit the light output of the aircraft navigation light 8 to a lateral side. Since the third light source 83 is arranged farther from the shutter element 85 than the first and second light sources 81, 82, however, the third light source 83 provides for a light output having a larger horizontal opening angle than the first or second light source 81, 82. In particular, the light output of the aircraft navigation light 8 has a horizontal opening angle of between 110° and 120°, when the first or second light source 81, 82 is operated, and has a horizontal opening angle of between 120° and 140°, when the third light source is operated.

Figure 8:
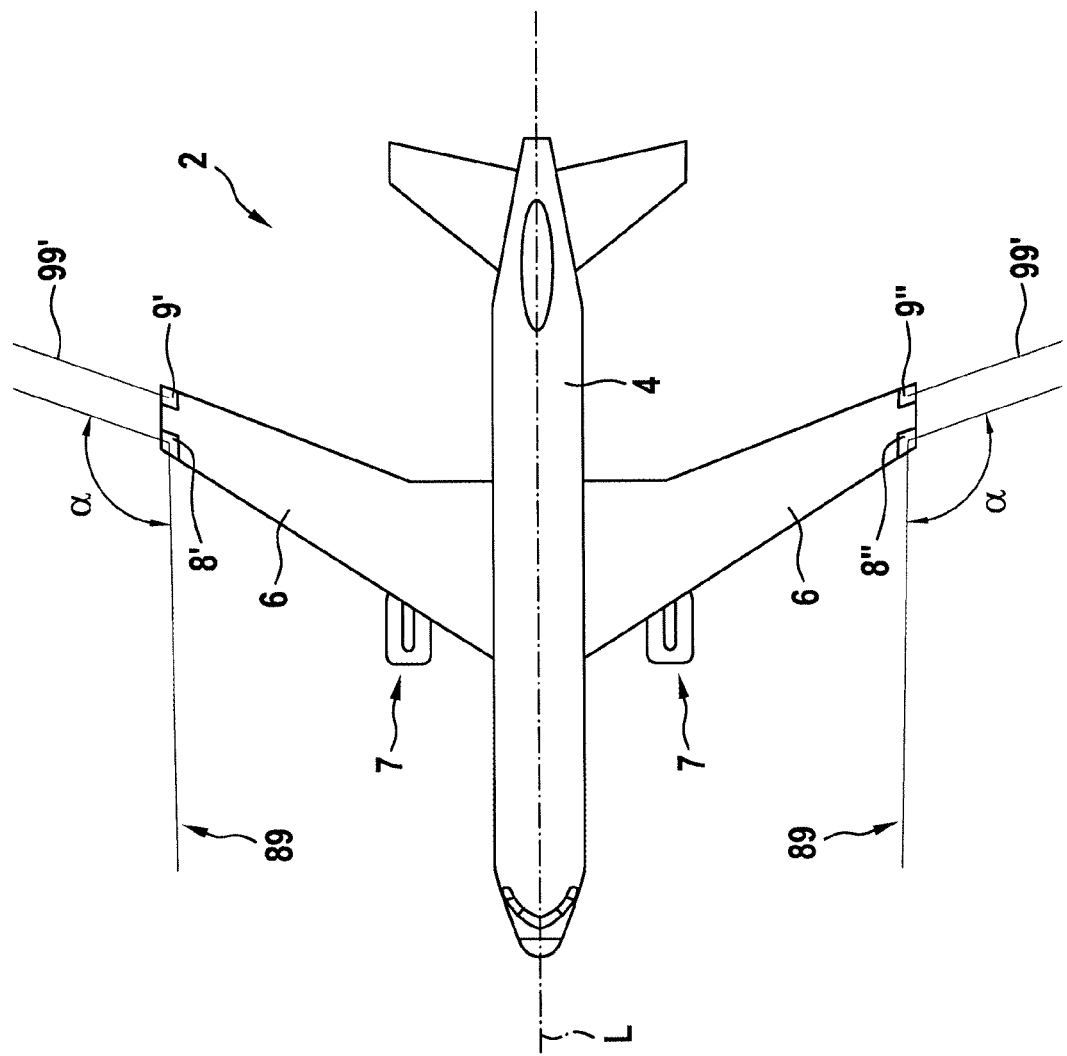
FIG. 8 shows a schematic top view of an aircraft in accordance with an exemplary embodiment of the invention, the aircraft being equipped with four aircraft navigation lights in accordance with exemplary embodiments of the invention.

FIG. 8 depicts a schematic top view of an aircraft 2 equipped with four aircraft navigation lights 8, 9 in accordance with an exemplary embodiment of the invention.

As described above, in FIG. 1, two aircraft navigation lights 9 in accordance with exemplary embodiments of the invention are assembled to the tail portion of the aircraft 2 to provide the tail navigation lighting. In the embodiment of FIG. 8, on the other hand, two aircraft navigation lights 9', 9" are arranged in rear portions of the right wing tip and the left wing tip of the aircraft 2 to provide the tail navigation lighting. The installation locations of the left forward aircraft navigation light 8' and the right forward aircraft navigation light 8" are identical to those of the embodiment of FIG. 1. That is, the right forward aircraft navigation light 8' and the left forward aircraft navigation light 8" are mounted to the front portions of the outer wing tips of the wing 6.

The tail navigation lights 9', 9" jointly provide a white light output 99', extending over an angle β of 140° around the tail of the aircraft 2. The white light output 99' is somewhat different from the white light output 99 of the embodiment of FIG. 1, because the tail part of the aircraft 2 has some shadowing effect. Still, via the combined light outputs of the two aircraft navigation lights 9', 9", the FAR requirements for the white rearward navigation lighting may be satisfied in an effective manner. The light outputs 89, 99' of the four aircraft navigation lights 8', 8", 9', 9", in combination, cover a full circle of 360°.

FIG. 9 depicts a schematic top view of the four aircraft navigation lights 8', 8", 9', 9", showing their inclination angles with respect to a forward/rearward direction of the aircraft 2. FIG. 9 is a top view in the aircraft frame of reference. That is, when the aircraft navigation lights 8', 8", 9', 9" are assembled to the aircraft, the respective common support plates 80 are oriented substantially vertically in the aircraft frame of reference. Also, the shutter elements 85 of the left and right forward aircraft navigation light 8', 8" are arranged closer to the center of the aircraft 2, i.e. inboard from the respective light sources, so that they can block light towards the sector of the respectively other forward aircraft navigation light 8', 8". In case of the two tail aircraft navigation lights 9', 9", on the other hand, the shutter elements 85 are arranged farther from the longitudinal axis L of the aircraft 2, i.e. outboard from the respective light sources, so that they can prevent white light from the tail aircraft navigation lights 9', 9" from entering into the lateral sectors covered by the left and right aircraft navigation lights 8', 8".

As shown in FIG. 9, the right forward aircraft navigation light 8' is assembled to the aircraft 2 such that its common support plate 80 is inclined at an inclination angle γ of 110° with respect to the forward flight direction of the aircraft 2. Likewise, the left forward aircraft navigation light 8" is assembled to the aircraft 2 such that its common support plate 80 is inclined at an inclination angle γ of between 110° with respect to the forward flight direction of the aircraft 2. On the other hand, the tail aircraft navigation lights 9', 9" are assembled to the aircraft 2 such that their common support plates 80 are inclined at an inclination angle γ of 110° with respect to a rearward direction of the aircraft 2. The inclination angles γ of the common support plates 80 of the four aircraft navigation lights 8', 8", 9', 9" may apply to both embodiments of FIG. 1 and FIG. 8.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft navigation light, configured to be usable as any of a left forward navigation light, a right forward navigation light, and a tail navigation light of an aircraft, the aircraft navigation light comprising:
   a common support plate which is substantially vertical in the aircraft frame of reference;
   a first light source arranged on the common support plate for emitting red light;
   a second light source arranged on the common support plate for emitting green light;
   a third light source arranged on the common support plate for emitting white light;
   a driving circuit coupled to the first light source, the second light source and the third light source and configured to supply power to a selected one of the first light source, the second light source, and the third light source; and
   a blocking element arranged to limit the light output of the aircraft navigation light to one lateral side;
   wherein the third light source is arranged farther from the blocking element than the first and second light sources,
   wherein the light output of the aircraft navigation light has a larger horizontal opening angle when the third light source is operated than when the first or second light source is operated, wherein the light output of the aircraft navigation light has a horizontal opening angle of between 110° and 120°, when the first or second light source is operated, and has a horizontal opening angle of between 120° and 140°, when the third light source is operated.

2. The aircraft navigation light according to claim 1, wherein the blocking element is symmetric with respect to a horizontal reference plane (A).

3. The aircraft navigation light according to claim 1,
   wherein the blocking element is a common shutter element, blocking a portion of the light emitted by any of the first light source, the second light source, and the third light source; or
   wherein the blocking element is a common reflector, reflecting a portion of the light emitted by any of the first light source, the second light source, and the third light source.

4. The aircraft navigation light according to claim 1, wherein the first light source and the second light source are arranged asymmetrically with respect to a horizontal reference plane (A) through the common support plate, wherein the first light source is arranged closer to the horizontal reference plane (A) than the second light source.

5. The aircraft navigation light according to claim 4, wherein the third light source is arranged symmetrically with respect to the horizontal reference plane (A).

6. The aircraft navigation light according to claim 1, wherein the blocking element is arranged to prevent light emission in a lateral sector covering at least a horizontal angle of between 0° and 30° with respect to the common support plate for the light output of any of the first light source, the second light source and the third light source.

7. The aircraft navigation light according to claim 1, wherein the first light source is a red LED, the second light source is a green LED, and the third light source is a white LED.

8. The aircraft navigation light according to claim 1, further comprising a lens arranged on the common support plate for conditioning light emitted by any of the first light source, the second light source, and the third light source,
    wherein the lens in particular jointly encases the first light source, the second light source, and the third light source, wherein the lens further in particular is in direct contact with the first light source, the second light source, and the third light source.

9. The aircraft, such as an airplane, comprising at least one aircraft navigation light according to claim 1.

10. The aircraft according to claim 9, comprising a left forward aircraft navigation light in a front portion of a left wing tip of the aircraft and a right forward aircraft navigation light in a front portion of a right wing tip of the aircraft, wherein each of the left forward aircraft navigation light and the right forward aircraft navigation light is an aircraft navigation light.

11. The aircraft according to claim 10, wherein the common support plate of each of the left forward aircraft navigation light and the right forward aircraft navigation light is inclined at an inclination angle of between 100° and 120° with respect to a forward flight direction of the aircraft.

12. The aircraft according to claim 9, comprising two tail aircraft navigation lights,
    wherein the two tail aircraft navigation lights are arranged in rear portions of a left wing tip and a right wing tip of the aircraft, respectively, or
    wherein the two tail navigation lights are arranged in a tail portion of the aircraft.

13. The aircraft according to claim 12, wherein the common support plate of each of the tail aircraft navigation lights is inclined at an inclination angle of be-tween 100° and 120° with respect to a rearward direction of the aircraft.

14. An aircraft navigation light, configured to be usable as any of a left forward navigation light, a right forward navigation light, and a tail navigation light of an aircraft, the aircraft navigation light comprising:
    a common support plate which is substantially vertical in the aircraft frame of reference;
    a first light source arranged on the common support plate for emitting red light;
    a second light source arranged on the common support plate for emit-ting green light;
    a third light source arranged on the common support plate for emitting white light;
    a driving circuit coupled to the first light source, the second light source and the third light source and configured to supply power to a selected one of the first light source, the second light source, and the third light source;
    a blocking element arranged to limit the light output of the aircraft navigation light to one lateral side; and
    a lens arranged on the common support plate for conditioning light emitted by any of the first light source, the second light source, and the third light source;
    wherein the blocking element and the lens are symmetric with respect to a horizontal reference plane (A) through the common support plate; and
    wherein the first light source and the second light source are arranged asymmetrically with respect to the horizontal reference plane (A), wherein the first light source is arranged closer to the horizontal reference plane (A) than the second light source.

15. The aircraft navigation light according to claim 14,
    wherein the blocking element is a common shutter element, blocking a portion of the light emitted by any of the first light source, the second light source, and the third light source; or
    wherein the blocking element is a common reflector, reflecting a portion of the light emitted by any of the first light source, the second light source, and the third light source.

16. The aircraft navigation light according to claim 14, wherein the third light source is arranged symmetrically with respect to the horizontal reference plane (A).

17. The aircraft navigation light according to claim 14, wherein the blocking element is arranged to prevent light emission in a lateral sector covering at least a horizontal angle of between 0° and 30° with respect to the common support plate for the light output of any of the first light source, the second light source and the third light source.

18. The aircraft navigation light according to claim 14, wherein the first light source is a red LED, the second light source is a green LED, and the third light source is a white LED.

19. The aircraft navigation light according to claim 14, wherein the lens jointly encases the first light source, the second light source, and the third light source.

\* \* \* \* \*